(12) United States Patent
Kim et al.

(10) Patent No.: US 8,384,764 B2
(45) Date of Patent: Feb. 26, 2013

(54) METHOD AND APPARATUS FOR GENERATING MULTIVIEW IMAGE DATA STREAM AND METHOD AND APPARATUS FOR DECODING THE SAME

(75) Inventors: Yong-tae Kim, Seoul (KR); Seo-young Hwang, Suwon-si (KR); Jae-seung Kim, Yongin-si (KR); Dae-sik Kim, Suwon-si (KR); Jae-yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1080 days.

(21) Appl. No.: 12/198,515

(22) Filed: Aug. 26, 2008

(65) Prior Publication Data

US 2009/0160932 A1 Jun. 25, 2009

Related U.S. Application Data

(60) Provisional application No. 61/015,405, filed on Dec. 20, 2007.

(30) Foreign Application Priority Data

Feb. 20, 2008 (KR) ........................ 10-2008-0015447

(51) Int. Cl.
*H04N 15/00* (2006.01)
(52) U.S. Cl. ............................................. 348/43; 348/42
(58) Field of Classification Search .................. None
See application file for complete search history.

(56) References Cited

U.S. PATENT DOCUMENTS

| | | | |
|---|---|---|---|
| 2003/0156652 A1* | 8/2003 | Wise et al. | 375/240.26 |
| 2004/0120396 A1* | 6/2004 | Yun et al. | 375/240.01 |
| 2006/0047674 A1* | 3/2006 | Visharam et al. | 707/101 |
| 2007/0156348 A1* | 7/2007 | Bae et al. | 702/19 |

* cited by examiner

*Primary Examiner* — Jude J Jean-Gilles
*Assistant Examiner* — Jaren M Means
(74) *Attorney, Agent, or Firm* — Sughrue Mion, PLLC

(57) ABSTRACT

Provided is a method and apparatus for generating a multi-view image data stream, the method including: recording multi-view image data onto the multi-view image data stream; recording onto the multi-view image data stream a multi-view image parameter recording parameter indicating whether a multi-view image parameter with regard to the multi-view image data is to be recorded onto the multi-view image data stream; and determining whether the multi-view image parameter is to be recorded onto the multi-view image data stream based on a value of the multi-view image data parameter recording parameter.

27 Claims, 14 Drawing Sheets

FIG. 4

```
unsigned int(32)    baseline;
unsigned int(32)    focal_length;
unsigned int(1)     is_camera_cross;
unsigned int(7)     reserved;
if(is_camera_cross)
{
        unsigned int(32) rotation;
}
```
⎬ 400

FIG. 5

```
unsigned int(32) translation[];
unsigned int(32) focal_length;
unsigned int(1) is_camera_cross;
unsigned int(7) reserved;
if(is_camera_cross)
{
        unsigned int(32) rotation;
}
}
```
⎬ 500

FIG. 6

```
unsigned int(16) DisplaySizeWidth;
unsigned int(16) DisplaySizeHeight;
unsigned int(16) ViewingDistance;
int(16) MinofDisparity;
int(16) MaxofDisparity;
```
⎬ 600

FIG. 7

```
unsigned int(16) item_count;
unsigned int (1) is_camParams;         ── 710
unsigned int (1) is_displaySafetyInfo; ── 720
unsigned int (6) reserved;

if(is_camParams || is_displaySafetyInfo)
{
    for(i=0; i<item_count; i++) {
        unsigned int(16) item_ID;
        unsigned int(1) is_camParamID;        ⎫
        unsigned int(1) is_displaySafeInfoID;  ⎬ 730
        unsigned int(6) Reserved;              ⎭

// HEREINAFTER PARAMETER ESTABLISHMENT AREAS
           ARE SELECTIVE AREAS if(is_camParams)  ── 742
        {
            If(is_camParamsID){  ── 744
                    unsigned int(16) new_camID;
            }
            else{
                    (A) // CAMERA PARAMETER  ── 746
            }
        }                                           740 if(is_displaySafetyInfo){  ── 752
                If(is_displaySafeInfoID){  ── 754
                        unsigned int(16) new_displayID;
                }else{
                        (B) // LOW FATIGUE PARAMETER  ── 756
                }
        }                                           750
    } /*<< LOOP END >>*/
}
```

FIG. 9

```
unsigned int(16) item_count;
unsigned int (1) is_camParams;               — 910
unsigned int (1) is_displaySafetyInfo;       — 920
unsigned int (6) reserved;
if(is_camParams || is_displaySafetyInfo)
{
   for(i=0; i<item_count; i++)
   {
          unsigned int(1) is_camParamsChanged;      — 930
          unsigned int(1) is_displaySafeInfoChanged; — 940
          unsigned int(6) Reserved;

┌ If(is_camParamsChanged && is_cam_params){  — 952
950 ┤         (A) // CAMERA PARAMETER  — 955
       └ }

┌ If(is_displaySafeInfoChanged && is_displaySafetyInfo){ — 962
960 ┤         (B) // LOW FATIGUE PARAMETER — 965
       └ }

```
unsigned int(16) item_count;
unsigned int (1) is_camParams;
unsigned int (1) is_displaySafetyInfo;
unsigned int (6) reserved;
if(is_camParams || is_displaySafetyInfo){
    for(i=0; i<item_count; i++) {
        unsigned int(1) is_camParamsSame;      — 1030
        unsigned int(1) is_displaySafeInfoSame; — 1040
        unsigned int(6) Reserved;
        if(is_camParams){
            If(is_camParamsSame){    — 1052
            }
            else{
                (A) // CAMERA PARAMETER — 1055
            }
        }                                               } 1050
        if(is_displaySafetyInfo){  — 1062
            If(is_displaySafeInfoSame)  {
            }
            else{
                (B) // LOW FATIGUE PARAMETER — 1065
            }
        }                                               } 1060
    } /* LOOP END */
}
```

FIG. 11

```
          unsigned int(16) item_count;
          unsigned int (1) is_camParams;
          unsigned int (1) is_displaySafetyInfo;
          unsigned int (6) reserved;
       ┌─ if(is_displaySafetyInfo){
          unsigned int (16) DisplaySizeWidth;
   1110 ─┤ unsigned int (16) DisplaySizeHeight;
          unsigned int(16) ViewingDistance;
       └─ }
          if(is_camParams || is_displaySafetyInfo)
          {
             for(i=0; i<item_count; i++) {
             unsigned int(1) is_camParamsSame;
             unsigned int(1) is_displaySafeInfoSame;
             unsigned int(6) Reserved;
                  if(is_camParams){
                       If(is_camParamsSame){
                       }
                       else{
                               (A) // CAMERA PARAMETER
                       }
                  }
              ┌─ if(is_displaySafetyInfo){
                       If(is_displaySafeInfoSame)
                       {
                       }
       1160 ─┤        else{
                               int(16) MinofDisparity;  ┐
                               int(16) MaxofDisparity;  ┘ 1165
                       }
              └─ }
             } /* LOOP END */
          }
```

FIG. 12

| ftyp | | | | | file type and compatibility |
|---|---|---|---|---|---|
| moov | 1210 | | | | container for all the metadata of timed resources |
| | ※ | | | | |
| | trak | 1220 | | | container for an individual track or stream indicate Main AV data or auxiliary data |
| | | ※ | | | |
| | | meta | | | |
| | | | ※ | 1230 | |
| | | mdia | | | container for the media information in a track |
| | | | ※ | 1240 | |
| | | | stbl | | |
| mdat | | 1250 | ※ | | media data container |
| meta | | | | | Metadata |
| | cmsi | | | | Stereoscopic and mono information |

1260

METHOD AND APPARATUS FOR GENERATING MULTIVIEW IMAGE DATA STREAM AND METHOD AND APPARATUS FOR DECODING THE SAME

CROSS-REFERENCE TO RELATED PATENT APPLICATIONS

This application claims priority from U.S. Provisional patent application No. 61/015,405, filed on Dec. 20, 2007, in the U.S. Patent and Trademark Office, and Korean Patent Application No. 10-2008-0015447, filed on Feb. 20, 2008, in the Korean Intellectual Property Office, and the disclosures of which are incorporated herein in their entirety by reference.

BACKGROUND OF THE INVENTION

1. Field of the Invention

Methods and apparatuses consistent with the present invention relate to encoding or decoding a multi-view image data stream, and more particularly, to defining various types of parameters with regard to a multi-view image stored in a multi-view data stream and encoding or decoding the multi-view image data stream including the defined parameters.

2. Description of the Related Art

A technology of displaying a three-dimensional (3D) image has been actively developed in order to display more realistic image information. The most common method of displaying a 3D image scans a left view image and a right view image to each corresponding location of a related art display device according to human visual characteristics, separates left and right views to correspond to left and right eyes of a viewer, and displays an image to realize a 3D stereoscopic image. A portable terminal embedded with a barrier liquid crystal display (LCD), which is one of a number of methods of displaying a 3D image, reproduces stereoscopic content and provides a user with a more realistic image.

FIG. 1 is a diagram of a related art International Standardization Organization (ISO)-based media file format. Referring to FIG. 1, a media file 100 of the ISO-based media file format comprises an mdat box 110 and a moov box 120. The mdat box 110 includes time-sequentially arranged interleaved video frames and audio frames. The moov box 120 stores boxes including a trak box having information on the media frames stored in the mdat box 110. A trak box 122 may include information on video frames, and another trak box 124 may include information on audio frames. 3D image data may be recorded in the ISO-based media file format.

SUMMARY OF THE INVENTION

The present invention provides a method and apparatus for generating a multi-view image data stream recording various types of parameters with regard to multi-view image data necessary for an efficient reconstruction of the multi-view image data. Throughout the specification, the language "record" or "recording" means "insert" or "inserting".

The present invention also provides a method and apparatus for decoding a multi-view image data stream recording various types of parameters.

The present invention also provides a method of controlling whether to record or use multi-view image parameters necessary for efficient recording and reconstruction of multi-view image data.

The present invention also provides a structure of a data stream in which multi-view image parameters are efficiently recorded.

According to an aspect of the present invention, there is provided a method of generating a multi-view image data stream, the method comprising: recording multi-view image data onto the multi-view image data stream; recording onto the multi-view image data stream a multi-view image parameter recording parameter indicating whether a multi-view image parameter with regard to the multi-view image data is to be recorded onto the multi-view image data stream; and determining whether the multi-view image parameter is to be recorded onto the multi-view image data stream based on a value of the multi-view image data parameter recording parameter.

The recording the multi-view image parameter recording parameter may comprise recording onto the multi-view image data stream a multi-view image parameter varying parameter indicating whether a multi-view image parameter with regard to a current data fragment of the multi-view image data varies from a camera parameter with regard to a previous data fragment.

The determining whether the multi-view image parameter is to be recorded may comprise determining whether the multi-view image parameter is to be recorded onto the multi-view image data stream based on values of the multi-view image parameter recording parameter and the multi-view image parameter varying parameter.

The determining whether the multi-view image parameter is to be recorded may comprise: if the multi-view image parameter with regard to the current data fragment varies from the multi-view image parameter with regard to the previous data fragment and the value of the multi-view image parameter varying parameter is set as "1", and if it is determined that the multi-view image parameter is to be recorded onto the multi-view image data stream and the value of the multi-view image parameter recording parameter is set as "1", determining that the multi-view image parameter with regard to the current data fragment is to be recorded onto the multi-view image stream based on the values of the multi-view image parameter recording parameter and the multi-view image parameter varying parameter, and recording the multi-view image parameter with regard to the current data fragment onto the multi-view image stream.

The multi-view image parameter may comprise at least one piece of information on the multi-view image and each piece of the information is established with regard to each of at least one data fragment.

The multi-view image parameter may comprise at least one of a camera parameter with regard to a camera that obtains the multi-view image data and a low fatigue parameter used to reduce fatigue resulting from viewing the multi-view image.

The camera parameter may comprise at least one of information on a center point, information on an aspect ratio of a pixel, information on a distance between cameras, information on a focal point, information on a rotational angle, and information on how cameras are disposed.

If the camera is a multi-view camera, the camera parameter may comprise at least one of information on a center point, information on an aspect ratio of a pixel, information on a parallel translation matrix between cameras, information on a focal point, information on a rotational angle matrix, and information on how cameras are disposed.

The low fatigue parameter may comprise at least one of information on a recommended viewing distance with regard to the multi-view image, information on a recommended display size, information on a minimum value of a disparity vector, and information on a maximum value of the disparity vector.

When the multi-view image comprises a base view image and other view images, a predetermined multi-view image parameter with regard to the base view image is established based on at least one multi-view image parameter with regard to the other view images, and a predetermined multi-view image parameter with regard to the other view image is established based on the predetermined multi-view image parameter with regard to the base view image.

The multi-view image data stream may be in an International Standardization Organization (ISO)-based media file format.

If the multi-view image data stream is in the ISO-based media file format, the ISO based media file format may comprise a moov box, an mdat box, and a meta box, wherein the multi-view image parameter is recorded onto at least one of a lower level box of the meta box that is the same level as the moov box, a lower level box of the moov box, a lower level box of a trak box that is a lower level box of the moov box, a lower level box of an mdia box that is a lower level box of the trak box, a lower level box of a stbl box that is a lower level box of the mdia box, a lower level box of a meta box that is a lower level box of the trak box, and a box recording information on an elementary stream (ES) that is recorded onto the mdat box among lower level boxes of the meta box that is a lower level box of the trak box.

According to another aspect of the present invention, there is provided a method of decoding a received multi-view image data stream, the method comprising: extracting from the multi-view image data stream a multi-view image parameter recording parameter indicating whether a multi-view image parameter with regard to the multi-view image data is to be recorded onto the multi-view image data stream; and determining whether the multi-view image parameter is to be extracted from the multi-view image data stream based on a value of the multi-view image data parameter recording parameter.

The extracting the multi-view image parameter recording parameter may comprise extracting a multi-view image parameter varying parameter indicating whether a multi-view image parameter with regard to a current data fragment of the multi-view image data varies from a camera parameter with regard to a previous data fragment from the multi-view image data stream.

The determining whether the multi-view image parameter is to be extracted may comprise determining whether the multi-view image parameter is to be extracted from the multi-view image data stream based on values of the multi-view image parameter recording parameter and the multi-view image parameter varying parameter.

The determining whether the multi-view image parameter is to be extracted may comprise: if the value of the multi-view image parameter varying parameter is "1", and if the value of the multi-view image parameter recording parameter is "1", determining that the multi-view image parameter with regard to the current data fragment is to be extracted from the multi-view image stream and extracting the multi-view image parameter with regard to the current data fragment from the multi-view image stream.

The method may further comprising: extracting the multi-view image data from the multi-view image data stream; and reconstructing the multi-view image using the multi-view image parameter and the extracted multi-view image data.

The multi-view image parameter may comprise at least one piece of information on the multi-view image and each piece of the information is established with regard to each of at least one data fragment.

The multi-view image parameter may comprise at least one of a camera parameter with regard to a camera that obtains the multi-view image data and a low fatigue parameter used to reduce fatigue resulting from viewing the multi-view image.

The camera parameter may comprise at least one of information on a center point, information on an aspect ratio of a pixel, information on a distance between cameras, information on a focal point, information on a rotational angle, and information on how cameras are disposed.

The camera parameter may comprise at least one of information on a center point, information on an aspect ratio of a pixel, information on a parallel translation matrix between cameras, information on a focal point, information on a rotational angle matrix, and information on how cameras are disposed.

The low fatigue parameter may comprise at least one of information on a recommended viewing distance with regard to the multi-view image, information on a recommended display size, information on a minimum value of a disparity vector, and information on a maximum value of the disparity vector.

When the multi-view image comprises a base view image and other view images, a predetermined multi-view image parameter with regard to the base view image is established based on at least one multi-view image parameter with regard to the other view images, and a predetermined multi-view image parameter with regard to the other view image is established based on the predetermined multi-view image parameter with regard to the base view image.

The multi-view image data stream may be in an ISO-based media file format.

If the multi-view image data stream is in the ISO-based media file format, the ISO based media file format may comprise a moov box, an mdat box, and a meta box, wherein the multi-view image parameter is recorded onto at least one of a lower level box of the meta box that is the same level as the moov box, a lower level box of the moov box, a lower level box of a trak box that is a lower level box of the moov box, a lower level box of an mdia box that is a lower level box of the trak box, a lower level box of a stbl box that is a lower level box of the mdia box, a lower level box of a meta box that is a lower level box of the trak box, and a box recording information on an ES that is recorded onto the mdat box among lower level boxes of the meta box that is a lower level box of the trak box.

According to another aspect of the present invention, there is provided an apparatus for generating a multi-view image data stream, the apparatus comprising: a multi-view image data recording unit recording multi-view image data onto the multi-view image data stream; a multi-view image parameter recording parameter recording unit recording onto the multi-view image data stream a multi-view image parameter recording parameter indicating whether a multi-view image parameter with regard to the multi-view image data is to be recorded onto the multi-view image data stream; and a multi-view image parameter recording unit determining whether the multi-view image parameter is to be recorded onto the multi-view image data stream based on a value of the multi-view image data parameter recording parameter.

The multi-view image parameter recording parameter recording unit comprises a multi-view image parameter varying parameter recording unit recording onto the multi-view image data stream a multi-view image parameter varying parameter indicating whether a multi-view image parameter with regard to a current data fragment of the multi-view image data varies from a camera parameter with regard to a previous data fragment.

The multi-view image parameter recording unit may determine whether the multi-view image parameter is to be recorded onto the multi-view image data stream based on values of the multi-view image parameter recording parameter and the multi-view image parameter varying parameter.

The multi-view image parameter recording unit, if the multi-view image parameter with regard to the current data fragment varies from the multi-view image parameter with regard to the previous data fragment, sets the value of the multi-view image parameter varying parameter as "1", and if it is determined that the multi-view image parameter is to be recorded onto the multi-view image data stream, sets the value of the multi-view image parameter recording parameter as "1", determines that the multi-view image parameter with regard to the current data fragment is to be recorded onto the multi-view image stream based on the values of the multi-view image parameter recording parameter and the multi-view image parameter varying parameter and recording the multi-view image parameter with regard to the current data fragment onto the multi-view image stream.

According to another aspect of the present invention, there is provided an apparatus for decoding a received multi-view image data stream, the apparatus comprising: a multi-view image parameter recording parameter extracting unit extracting from the multi-view image data stream a multi-view image parameter recording parameter indicating whether a multi-view image parameter with regard to the multi-view image data is to be recorded onto the multi-view image data stream; and a multi-view image parameter extracting unit determining whether the multi-view image parameter is to be extracted from the multi-view image data stream based on a value of the multi-view image data parameter recording parameter.

The multi-view image parameter recording parameter extracting unit comprises a multi-view image parameter varying parameter extracting unit extracting a multi-view image parameter varying parameter indicating whether a multi-view image parameter with regard to a current data fragment of the multi-view image data varies from a camera parameter with regard to a previous data fragment from the multi-view image data stream.

The multi-view image parameter extracting unit determines whether the multi-view image parameter is to be extracted from the multi-view image data stream based on values of the multi-view image parameter recording parameter and the multi-view image parameter varying parameter.

The multi-view image parameter recording parameter extracting unit, if the value of the multi-view image parameter varying parameter is "1", and if the value of the multi-view image parameter recording parameter is "1", determines that the multi-view image parameter with regard to the current data fragment is to be extracted from the multi-view image stream and extracting the multi-view image parameter with regard to the current data fragment from the multi-view image stream.

The apparatus may further comprise: a multi-view image data extracting unit extracting the multi-view image data from the multi-view image data stream; and a multi-view image reconstructing unit reconstructing the multi-view image using the multi-view image parameter and the extracted multi-view image data.

According to another aspect of the present invention, there is provided a computer readable recording medium having recorded thereon a program for executing the method of generating a multi-view image data stream.

According to another aspect of the present invention, there is provided a computer readable recording medium having recorded thereon a program for executing the method of decoding a multi-view image data stream.

BRIEF DESCRIPTION OF THE DRAWINGS

The above and other aspects of the present invention will become more apparent by describing in detail exemplary embodiments thereof with reference to the attached drawings, in which:

FIG. 4 illustrates syntax of a camera parameter, according to an exemplary embodiment of the present invention;

FIG. 5 illustrates syntax of a camera parameter, according to another exemplary embodiment of the present invention;

FIG. 6 illustrates syntax of a low fatigue parameter, according to an exemplary embodiment of the present invention;

FIG. 7 illustrates syntax defining a camera parameter and a low fatigue parameter based on whether to record a parameter, according to an exemplary embodiment of the present invention;

FIG. 9 illustrates syntax defining a camera parameter and a low fatigue parameter based on whether the camera and low fatigue parameters are recorded and vary, according to an exemplary embodiment of the present invention;

FIG. 10 illustrates syntax defining a camera parameter and a low fatigue parameter based on whether the camera and low fatigue parameters are recorded and based on the identity of the camera parameter and the low fatigue parameter, according to an exemplary embodiment of the present invention;

FIG. 11 illustrates syntax defined by a multi-view image parameter through all data fragments, according to an exemplary embodiment of the present invention;

FIG. 12 is a table of a box list in an ISO-based media file format in which a camera parameter and a low fatigue parameter are to be stored, according to an exemplary embodiment of the present invention;

DETAILED DESCRIPTION OF EXEMPLARY EMBODIMENTS

Hereinafter, the present invention will be described more fully with reference to the accompanying drawings, in which exemplary embodiments of the invention are shown.

Figure 1:
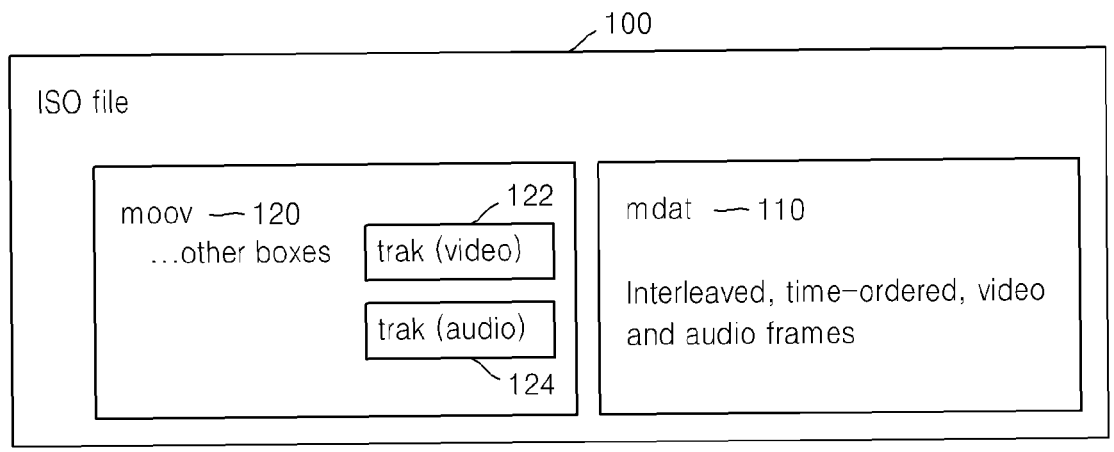
FIG. 1 is a diagram of a related art International Standardization Organization (ISO)-based media file format.
Figure 2:
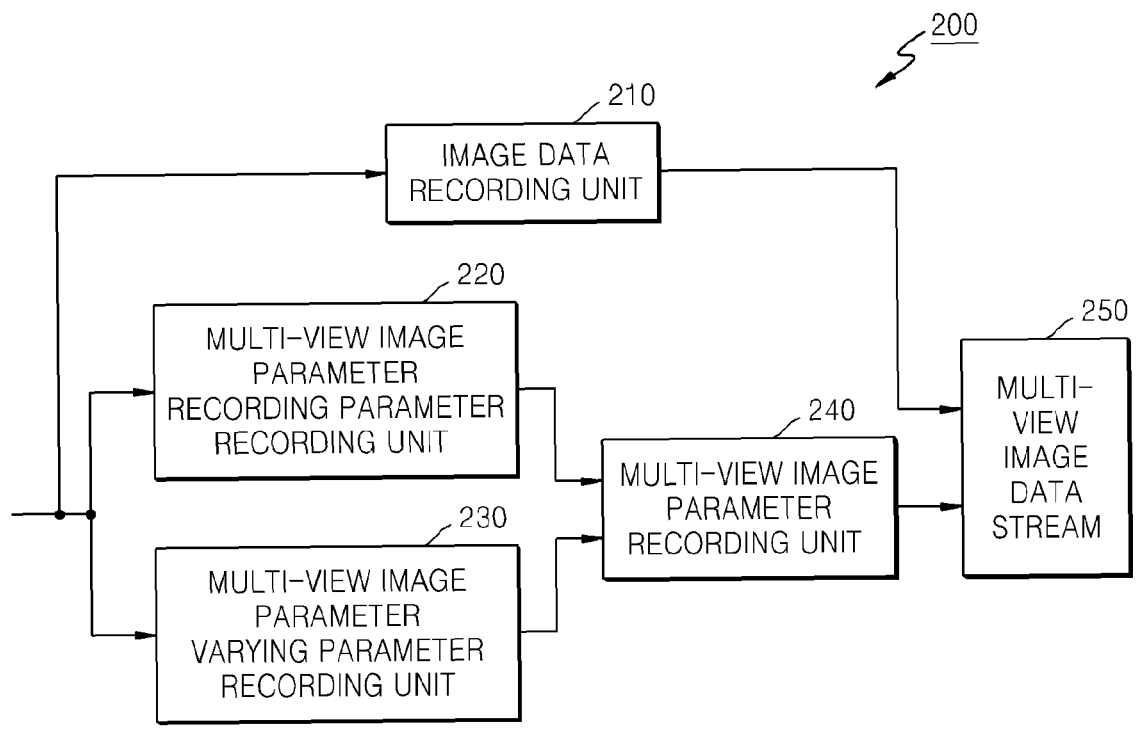
FIG. 2 is a block diagram of an apparatus for generating a multi-view image data stream, according to an exemplary embodiment of the present invention.

FIG. 2 is a block diagram of an apparatus 200 for generating a multi-view image data stream according to an exemplary embodiment of the present invention. Referring to FIG. 2, the apparatus 200 for generating the multi-view image data stream comprises an image data recording unit 210, a multi-view image parameter recording parameter recording unit 220, a multi-view image parameter varying parameter recording unit 230, and a multi-view image parameter recording unit 240.

The image data recording unit 210 records multi-view image data onto a multi-view image data stream 250. The image data recording unit 210 may record the multi-view image data onto a payload area of the multi-view image data stream 250.

The multi-view image parameter recording parameter recording unit 220 records a multi-view image parameter recording parameter onto the multi-view image data stream 250. The multi-view image parameter recording parameter represents whether a multi-view image data parameter with regard to the multi-view image data is to be recorded onto the multi-view image data stream 250.

The multi-view image parameter varying parameter recording unit 230 records a multi-view image parameter varying parameter onto the multi-view image data stream 250. The multi-view image parameter varying parameter represents whether a multi-view image parameter with regard to a current data fragment of the multi-view image data varies from a multi-view image parameter with regard to a previous data fragment.

The multi-view image parameter recording parameter recording unit 220 may comprise the multi-view image parameter varying parameter recording unit 230.

The multi-view image parameter recording unit 240 determines whether to record the multi-view image parameter onto the multi-view image data stream 250 based on a value of the multi-view image parameter recording parameter. When it is determined that the multi-view image parameter recording parameter and the multi-view image parameter varying parameter are recorded onto the multi-view image data stream 250, the multi-view image parameter recording unit 240 determines whether to record the multi-view image parameter onto the multi-view image data stream 250 based on the value of the multi-view image parameter recording parameter and a value of the multi-view image parameter varying parameter.

If the multi-view image parameter recording unit 240 determines that the multi-view image parameter is to be recorded onto the multi-view image data stream 250 based on the value of the multi-view image parameter recording parameter, and that the multi-view image parameter with regard to the previous data fragment and a new multi-view image parameter are to be recorded onto the multi-view image data stream 250 based on the value of the multi-view image parameter varying parameter, the multi-view image parameter recording unit 240 records the multi-view image parameter onto the multi-view image data stream 250.

The multi-view image parameter includes at least one piece of information on a multi-view image. Each piece of the information is individually set with regard to at least one data fragment. In more detail, the multi-view image parameter may be individually set by each data fragment or by a plurality of data fragments. The number of data fragments in which the multi-view image parameter does not vary may not be fixed. A single multi-view image parameter value may be globally consistent with regard to all data fragments, i.e. one piece of data.

The multi-view image parameter may comprise at least one of a camera parameter with regard to a camera that obtains the multi-view image data and a low fatigue parameter used to reduce fatigue resulting from viewing the multi-view image.

Since the multi-view image parameter may be the camera parameter and the low fatigue parameter, the multi-view image parameter recording parameter may comprise at least one of a parameter indicating whether the camera parameter is to be recorded onto the multi-view image data stream and a parameter indicating whether the low fatigue parameter is to be recorded onto the multi-view image data stream.

Likewise, the multi-view image parameter varying parameter may comprise at least one of a parameter indicating whether the camera parameter varies from a camera parameter with regard to the previous data fragment and a parameter indicating whether the low fatigue parameter varies from a low fatigue parameter with regard to the previous data fragment.

The camera parameter includes at least one of information on a center point, information on an aspect ratio of a pixel, information on a distance between cameras, information on a focal point, information on a rotational angle, and information on how cameras are disposed. If a distance between two or more cameras is not defined with respect to an axis in a coordinate system in a multi-view camera system, the camera parameter may include information on a parallel translation matrix between cameras instead of the information on the distance between cameras, and information on a rotational angle matrix instead of the information on the rotational angle.

The low fatigue parameter includes at least one of information on a recommended viewing distance with regard to the multi-view image, information on a recommended display size, information on a minimum value of a disparity vector, and information on a maximum value of the disparity vector.

When the multi-view image comprises a base view image and other view images, a multi-view image parameter with regard to the base view image may be set based on at least one multi-view image parameter with regard to other view images. On the other hand, at least one multi-view image parameter with regard to each of the other view images may be set based on the multi-view image parameter with regard to the base view image.

In the present exemplary embodiment, the multi-view image data stream is in an International Standardization Organization (ISO)-based media file format. If the multi-view image data stream is the ISO-based media file format that includes a moov box, an mdat box, and a meta box, the multi-view image parameter may be recorded onto at least one of a lower level box of the meta box that is the same level as the moov box, a lower level box of the moov box, and a lower level box of a trak box that is a lower level box of the moov box.

The multi-view image parameter may be recorded onto at least one of a lower level box of a mdia box that is a lower level box of the trak box, a lower level box of a stbl box that is a lower level box of the mdia box, a lower level box (this meta box is a box at a different location from that of the meta box of the same level as the moov box) of a meta box that is a lower level box of the trak box, and a box recording information on an elementary stream (ES) that is recorded onto the mdat box among lower level boxes of the meta box that is a lower level box of the trak box.

Figure 3:
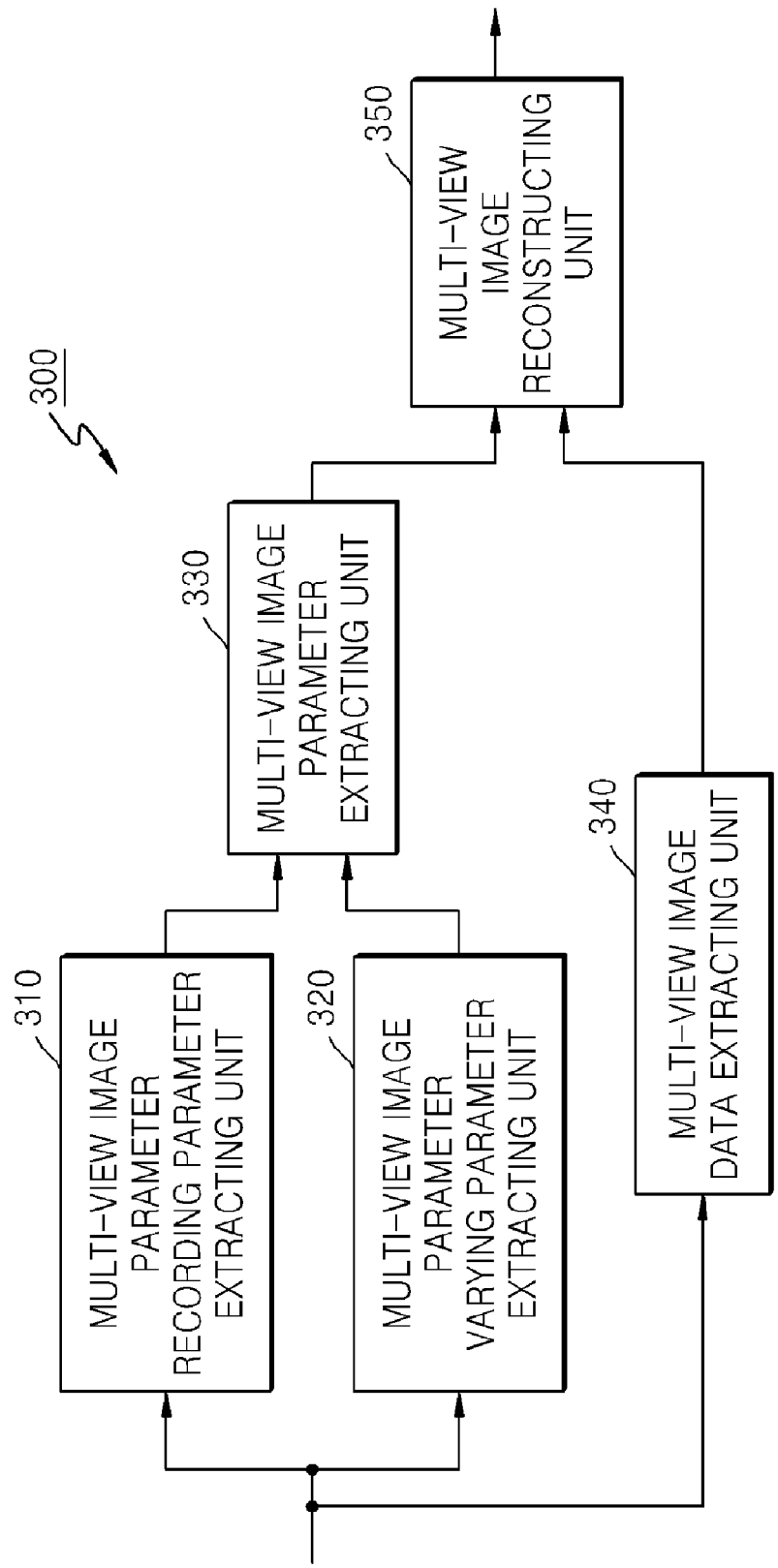
FIG. 3 is a block diagram of an apparatus for decoding a multi-view image data stream, according to an exemplary embodiment of the present invention.

FIG. 3 is a block diagram of an apparatus 300 for decoding a multi-view image data stream according to an exemplary embodiment of the present invention. Referring to FIG. 3, the apparatus 300 for decoding the multi-view image data stream comprises a multi-view image parameter recording parameter extracting unit 310, a multi-view image parameter varying parameter extracting unit 320, a multi-view image parameter extracting unit 330, a multi-view image data extracting unit 340, and a multi-view image reconstructing unit 350.

A multi-view image parameter of the apparatus 300 for decoding the multi-view image data stream is identical to that of the apparatus 200 for generating the multi-view image data stream.

The multi-view image parameter recording parameter extracting unit 310 extracts a multi-view image parameter recording parameter from the received multi-view image data stream.

The multi-view image parameter varying parameter extracting unit 320 extracts a multi-view image parameter varying parameter from the received multi-view image data stream.

The multi-view image parameter recording parameter extracting unit 310 may comprise the multi-view image parameter varying parameter extracting unit 320.

The multi-view image parameter extracting unit 330 determines whether to extract the multi-view image parameter from the multi-view image data stream based on a value of the multi-view image parameter recording parameter. When the multi-view image parameter varying parameter extracting unit 320 extracts the multi-view parameter varying parameter, the multi-view image parameter extracting unit 330 determines whether to extract the multi-view image parameter from the multi-view image data stream based on the multi-view image parameter varying parameter and the multi-view image parameter recording parameter.

In more detail, the multi-view image parameter extracting unit 330 analyzes the multi-view image parameter recording parameter and the multi-view image parameter varying parameter. If the multi-view image parameter recording parameter indicates that a new multi-view image parameter is recorded onto the multi-view image data stream, and the multi-view image parameter varying parameter indicates that the new multi-view image parameter varies from a previous multi-view image parameter, the multi-view image parameter extracting unit 330 extracts the new multi-view image parameter from the received multi-view image data stream.

The multi-view image data extracting unit 340 extracts the multi-view image data from the multi-view image data stream.

The multi-view image reconstructing unit 350 reconstructs the multi-view image using the multi-view image parameter and the extracted multi-view image data.

As described above, if the multi-view image data stream is an ISO-based file format, the multi-view image parameter may be extracted from a box storing information and a parameter regarding the multi-view image. The box may be determined according to the above exemplary embodiments.

The multi-view image parameter provided by exemplary embodiments of the present invention will now be described with reference to FIGS. 4 through 11.

FIG. 4 illustrates a syntax 400 of a camera parameter according to an exemplary embodiment of the present invention. Referring to FIG. 4, the syntax 400 of the camera parameter defines information (baseline) on a distance between cameras, information (focal_length) on a focal distance, information (is_camera_cross) on how cameras are disposed, and information (rotation) on a rotational angle. The camera parameter may include at least one of the information on the distance between cameras, the information on the focal distance, the information on how cameras are disposed, the information on the rotational angle, information on a center point, and information on an aspect ratio of a pixel.

FIG. 5 illustrates a syntax 500 of a camera parameter according to another exemplary embodiment of the present invention. Referring to FIG. 5, the syntax 500 of the camera parameter may define parallel translation matrix information (translation[ ]) instead of the information (baseline in FIG. 4) on the distance between cameras. When two cameras of a stereoscopic system shares an axis of a coordinate system, although the parallel translation information between two cameras is presented using the information (baseline) on the distance between two cameras on the shared axis, it is not assumed that a general multi-view system always shares an axis of camera coordinates. Therefore, in order to present the distance between cameras in the general multi-view system, the parallel translation matrix information (translation[ ]) that is presented as a relative value based on a camera coordinate at a specific view is needed.

Since cameras of the general multi-view system cannot define the information on the rotational information as a single value, rotational angle matrix information (rotation[ ]) is needed.

FIG. 6 illustrates a syntax 600 of a low fatigue parameter according to an exemplary embodiment of the present invention. Referring to FIG. 6, the syntax 600 of the low fatigue parameter defines information (ViewingDistance) on a recommended viewing distance, information (DisplaySizeWidth/DisplaySizeHeight) on a recommended display size, information (MinofDisparity) on a minimum value of a disparity vector, and information (MaxofDisparity) on a maximum value of the disparity vector. The information (ViewingDistance) on the recommended viewing distance and the information (DisplaySizeWidth/DisplaySizeHeight) on the recommended display size may be information recommended by a content provider providing a multi-view image in order to reproduce the multi-view image in an optimized environment. The information (MinofDisparity) on the minimum value of the disparity vector and information (MaxofDisparity) on the maximum value of the disparity vector are examples of a representative value of a disparity vector value between different view images of the multi-view image. The low fatigue parameter of another exemplary embodiment may include at least one of the information (ViewingDistance) on the recommended viewing distance, the information (DisplaySizeWidth/DisplaySizeHeight) on the recommended display size, the information (MinofDisparity) on the minimum value of the disparity vector, and the information (MaxofDisparity) on the maximum value of the disparity vector.

FIG. 7 illustrates a syntax defining a camera parameter and a low fatigue parameter based on whether to record a parameter according to an exemplary embodiment of the present invention. Referring to FIG. 7, it is determined whether to record the parameter using a multi-view image parameter recording parameter. Since multi-view image parameters of the present exemplary embodiment may be the camera parameters 400 and 500 and the low fatigue parameter 600, the multi-view image parameter recording parameter may include a camera parameter recording parameter is_camParams 710 and a low fatigue parameter recording parameter is_displaySafetyInfo 720.

Although the camera parameters 400 and 500 and the low fatigue parameter 600 are defined in the present exemplary embodiment, the multi-view image parameter does not need to simultaneously include the camera parameters 400 and 500 and the low fatigue parameter 600 all the time. Likewise, the camera parameter recording parameter is_camParams 710 and the low fatigue parameter recording parameter is_displaySafetyInfo 720 are defined according to the definition of each multi-view image parameter.

A syntax 730 defining ID related parameters presents whether to utilize multi-view image parameters according to item IDs for identifying items of data. The items of data may be various data units, and may be a data fragment frame unit and an elementary stream (ES) unit. For example, the syntax 730 defining ID related parameters presents whether the multi-view image parameter is defined according to an item ID used to identify each ES onto which each view image comprising the multi-view image is recorded (is_camParamID, is_displaySafeInfoID). A method of utilizing multi-view image parameters according to IDs of data items will be described below with reference to FIGS. 8A and 8B.

Parameters 'reserved" and 'Reserved' present reserved allocation bits that are to be defined later.

A syntax 740 relating to the camera parameter defines the camera parameter if it is determined that the camera parameter is recorded onto a multi-view data stream according to a camera parameter recording parameter is_camParams 742. It is determined whether camera parameters in item IDs are defined according to a parameter is_camParamsID 744 indicating whether camera parameters by item IDs are defined. The camera parameter is established when defined in (A) 746 that may include the syntaxes 400 and 500 of the camera parameter shown in FIGS. 4 and 5, respectively.

Likewise, a syntax 750 relating to the low fatigue parameter determines that the low fatigue parameter is defined according to a low fatigue parameter recording parameter is_displaySafetyInfo 752 and a parameter is_displaySafeInfoID 754 indicating whether low fatigue parameters by item IDs are defined. The syntax 600 of the low fatigue parameter shown in FIG. 6 may be included in (B) 756.

As described above, when the camera parameter with regard to the multi-view image is established, it is necessary to define the syntax 740 relating to the camera parameter, and when the low fatigue parameter with regard to the multi-view image is established, it is necessary to define the syntax 750 relating to the low fatigue parameter.

Figure 8A:
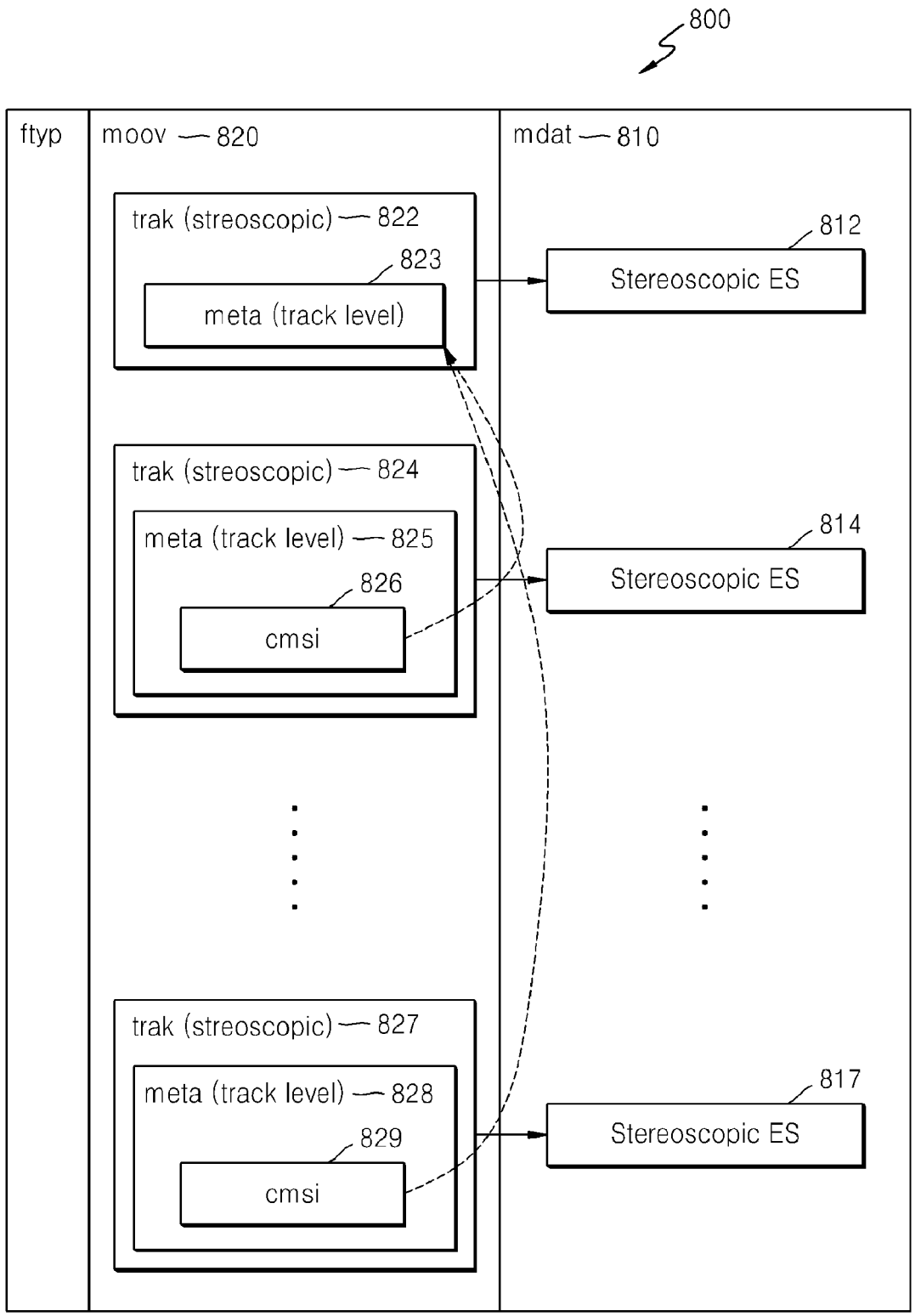
FIG. 8A is a diagram of parameters referred to by parameter IDs, according to an exemplary embodiment of the present invention.

FIG. 8A is a diagram of parameters referred to by parameter IDs according to an exemplary embodiment of the present invention. Referring to FIG. 8A, a multi-view image data stream 800 comprises an ftyp box, a moov box 820, and an mdat box 810. The mdat box 810 includes multi-view image media data. The moov box 820 includes various types of information and parameters with regard to the multi-view image media data.

The multi-view image media data includes image data about a plurality of views. The multi-view image media data of each view may be stored in a separate ES. In more detail, stereoscopic ESs 812, 814, and 817 include different pieces of view image data.

Trak boxes 822, 824, and 827 of the moov box 820 include the stereoscopic ESs 812, 814, and 817, respectively. The trak boxes 822, 824, and 827 include meta boxes 823, 825, and 828, respectively. Although an ISO-based media file format may comprise a meta box that that is the same level as the ftyp box, the moov box 820, and the mdat box 810, another meta box may be included as a lower level box of the trak boxes 822, 824, and 827. The meta boxes 825 and 828 includes cmsi boxes 826 and 829 and store the multi-view image parameter in the cmsi boxes 826 and 829. In more detail, the multi-view image parameter with regard to the multi-view image data of the stereoscopic ES 814 is recorded onto the cmsi box 826, and the multi-view image parameter with regard to the multi-view image data of the stereoscopic ES 817 is recorded onto the cmsi box 829.

Items of the multi-view image data stream 800 may be defined according to the stereoscopic ESs 812, 814, and 817, and item IDs may be defined to identify items. The multi-view image parameters are independently established according to item IDs of relating image data, and thus the multi-view image parameter corresponding to each stereoscopic ES ID is defined.

In this case, it is assumed that the stereoscopic ES 812 concerns base view image data for descriptive convenience. The meta box 823 includes a parameter with regard to the base view image data in the stereoscopic ES 812. The multi-view image parameter of the cmsi box 826 is a parameter with regard to image data at a view other than a base view of the stereoscopic ES 814. The multi-view image parameter of the cmsi box 829 is a parameter with regard to image data at another view of the stereoscopic ES 817.

The multi-view image parameters of the cmsi boxes 826 and 829 may refer to the parameters of the meta box 823. For example, if an image parameter at another view other than a base view is established as a relative value of an image parameter at the base view, the multi-view image parameters of the cmsi boxes 826 and 829 are analyzed by using the image parameter at the base view, and the parameter of the meta box 823 can be referred to.

Figure 8B:
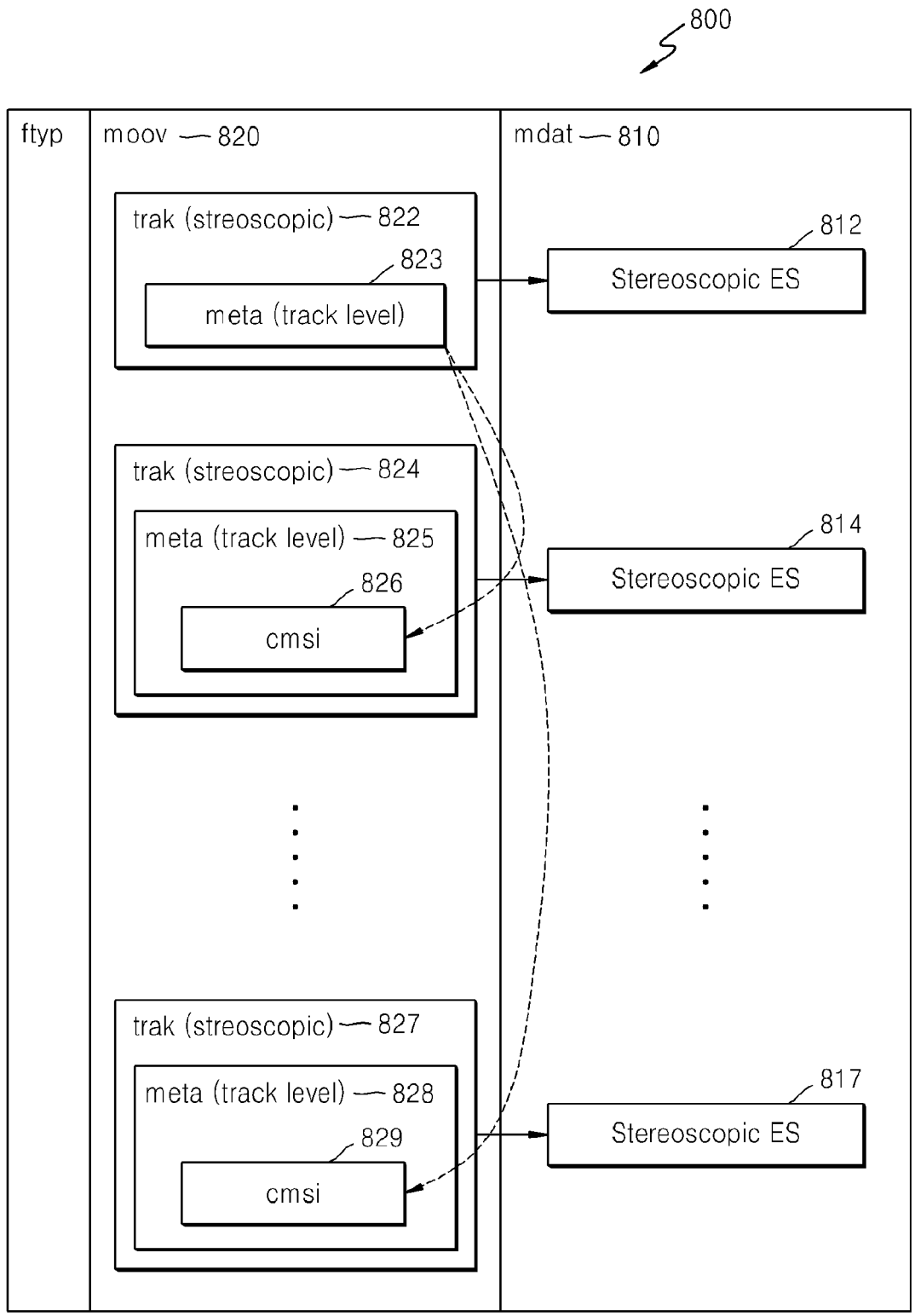
FIG. 8B is a diagram of parameters referred to by parameter IDs, according to another exemplary embodiment of the present invention.

FIG. 8B is a diagram of parameters referred to by parameter IDs according to another exemplary embodiment of the present invention.

In addition to the base view image parameters referred to by the image parameters at another view other than the image parameter at the base view so as to analyze the multi-view image parameter defined according to item IDs shown in FIG. 8A, the image parameter at the base view may refer to the image parameter at another view.

In more detail, in order to establish or analyze the image parameter at the base view of the meta box 823, at least one of an image parameter at a view of the cmsi box 826 and image parameters at other views such as an image parameter at another view of the cmsi box 829 may be referred to by the image parameter at the base view of the meta box 823.

Referring to FIGS. 8A and 8B, if the multi-view image is a stereoscopic image, a base view image may be a left view image and another view image may be a right view image. In this case, a parameter with regard to the right view image may refer to a parameter with regard to the left view image that is the base view image, and the parameter with regard to the left view image that is the base view image may refer to the parameter with regard to the right view image.

FIG. 9 illustrates a syntax defining a camera parameter and a low fatigue parameter based on whether the camera and low fatigue parameters are recorded and vary according to an exemplary embodiment of the present invention. Referring to FIG. 9, the syntax determines whether to record a multi-view image parameter using a camera parameter recording parameter is camParams 910 and a low fatigue parameter recording parameter is_displaySafetyInfo 920. The syntax determines whether a multi-view image parameter with regard to a current data fragment varies from a multi-view image parameter with regard to a previous data fragment according to a multi-view image parameter varying parameter. The multi-view image parameter varying parameter may comprise a camera parameter varying parameter is_camParamsChanged 930 and a low fatigue parameter varying parameter is displaySafeInfoChanged 940.

The multi-view image parameter varying parameter compares the multi-view image parameter with regard to the current data fragment with the multi-view image parameter with regard to the previous data fragment. If the multi-view image parameter with regard to the current data fragment does not vary from the multi-view image parameter with regard to the previous data fragment, since a previous multi-view image parameter may be used, it is possible to re-use the multi-view image parameter with regard to the current data fragment.

The apparatus 200 for generating a multi-view image data stream confirms the multi-view image parameter varying parameters 930 and 940 and determines whether to record the multi-view image parameter with regard to the current data fragment onto the multi-view image data stream. The apparatus 300 for decoding the multi-view image data stream confirms the multi-view image parameter varying parameters 930 and 940 and extracts the multi-view image parameter with regard to the current data fragment from the multi-view image data stream. Since the multi-view image parameters are compared to each other according to the data fragments, they are defined in a conditional FOR subroutine.

A syntax 950 relating to the camera parameter determines whether to define the camera parameter on the condition 952 of values of a camera parameter recording parameter 910 and a camera parameter varying parameter 930. In more detail, the camera parameter is included in the multi-view image data stream if the camera parameter recording parameter 910 is "true", and a new multi-view image parameter with regard to varied current data fragment is included in the multi-view image data stream if the camera parameter varying parameter 930 is also "true". Therefore, the camera parameter is defined according to the syntaxes 400 and 500 of the camera parameter included in a part (A) 955 only if both camera parameter recording parameter 910 and camera parameter varying parameter 930 are "true".

(i) Since the camera parameter is not recorded onto the multi-view image data stream, the camera parameter recording parameter 910 is "false" or (ii) since a camera parameter with regard to the current data fragment does not vary from a camera parameter with regard to the previous data fragment, the camera parameter varying parameter 930 is "false". In this case, the definition of the camera parameter of the part (A) 955 is not performed.

A syntax 960 relating to the low fatigue parameter determines whether to define the low fatigue parameter on the condition 962 of values of a low fatigue parameter recording parameter 920 and a low fatigue parameter varying parameter 940. In more detail, the syntax 600 of the low fatigue parameter is included in a part (B) 965 if the low fatigue parameter recording parameter 920 is "true", and if the low fatigue parameter varying parameter 940 is also "true".

FIG. 10 illustrates a syntax defining a camera parameter and a low fatigue parameter based on whether the camera and low fatigue parameters are recorded and based on the identity of the camera parameter and the low fatigue parameter according to an exemplary embodiment of the present invention. Referring to FIG. 10, the syntax defines a multi-view image parameter based on a multi-view image parameter recording parameter and a multi-view image parameter identity parameter. A camera parameter identity parameter is_camParamsSame 1030 and a low fatigue parameter identity parameter is_displaysafetyInfoSame 1040 present whether the camera parameter and the low fatigue parameter with regard to a current data fragment are identical to those of a previous data fragment.

A syntax 1050 relating to the camera parameter is defined based on a camera parameter recording parameter is_camParams and a camera parameter identify parameter is_camParamsSame 1030. In more detail, if the camera parameter is recorded onto the multi-view image parameter, the camera parameter recording parameter is_camParams is "true", and if the camera parameter with regard to the current data fragment is not identical to that with regard to the previous data fragment, the camera parameter identify parameter is_camParamsSame 1030 is "false" (1052). In this case, since a new definition of the camera parameter is necessary, the syntax defining the camera parameter of a part (A) 1055 should be performed.

Likewise, a syntax 1060 relating to the low fatigue parameter is defined based on a low fatigue parameter recording parameter is_displaysafetyInfo and a low fatigue parameter identify parameter is_displaySafeInfoSame 1040. In more detail, if the low fatigue parameter is recorded onto the multi-view image parameter, the low fatigue parameter recording parameter is_displaySafetyInfo is "true", and if a low fatigue parameter with regard to the current data fragment is not identical to that with regard to the previous data fragment, the low fatigue parameter identify parameter is_dispalySafeInfoSame 1040 should be "false" (1062). In this case, a syntax defining the low fatigue parameter of a part (B) 1065 is performed. The parameters are defined globally through all data fragments, thereby reducing storage spaces compared to those of the separately defined parameters of data fragments.

FIG. 11 illustrates a syntax globally defined by a multi-view image parameter through all data fragments according to an exemplary embodiment of the present invention. Referring to FIG. 11, although the multi-view image parameter of an exemplary embodiment of the present invention may be established according to data fragments, the multi-view image parameter can be globally constant through all data fragments. Since global low fatigue parameter syntax 1110 defines some constant low fatigue parameter with regard to all data fragments, it is not included in a conditional FOR subroutine but is defined through all the data fragments. Local low fatigue parameter syntax 1160 defines other low fatigue parameters 1165 that are not defined through all data fragments in the conditional FOR subroutine. Although global low fatigue parameters are illustrated in the present exemplary embodiment, the camera parameter can also be globally defined through all data fragments.

Although the syntaxes of the multi-view image parameter shown in FIGS. 7 through 11 define both the camera parameter and the low fatigue parameter, only one of the camera parameter and the low fatigue parameter can be defined as described above.

Hereinafter, multi-view image parameters stored in an ISO-based media file format provided by the present invention will now be described with reference to FIGS. 12 through 14.

FIG. 12 is a table of a box list in an ISO-based media file format in which a camera parameter and a low fatigue parameter are to be stored according to an exemplary embodiment of the present invention. Referring to FIG. 12, the highest level box in the ISO based media file format may include an ftyp box, a moov box, an mdat box, and a meta box. The ftyp box stores information on a file type and compatibility. The moov box is a space for all types of meta data of timed resources. The mdat box is a storage space of media data. The meta box stores meta data. The multi-view image parameters including the camera parameter and the low fatigue parameter of the present exemplary embodiment are included in a cmsi box storing information on a multi-view image and a single-view image.

The cmsi box may be included in any one of a lower level box 1210 of the moov box, a lower level box 1220 of a trak box that is a lower level box of the moov box, a lower level box 1230 of a meta box that is a lower level box of the trak box, a lower level box 1240 of an mdia box that is a lower level box of the trak box, a lower level box 1250 of an stbl box that is a lower level box of the mdia box, and a lower level box 1260 of the meta box that is the same level as the moov box. A cmsi box may be included in a box onto which information on an ES, recorded onto the mdat box among lower level boxes of the meta box that is a lower level box of the trak box, is recorded.

Figure 13:
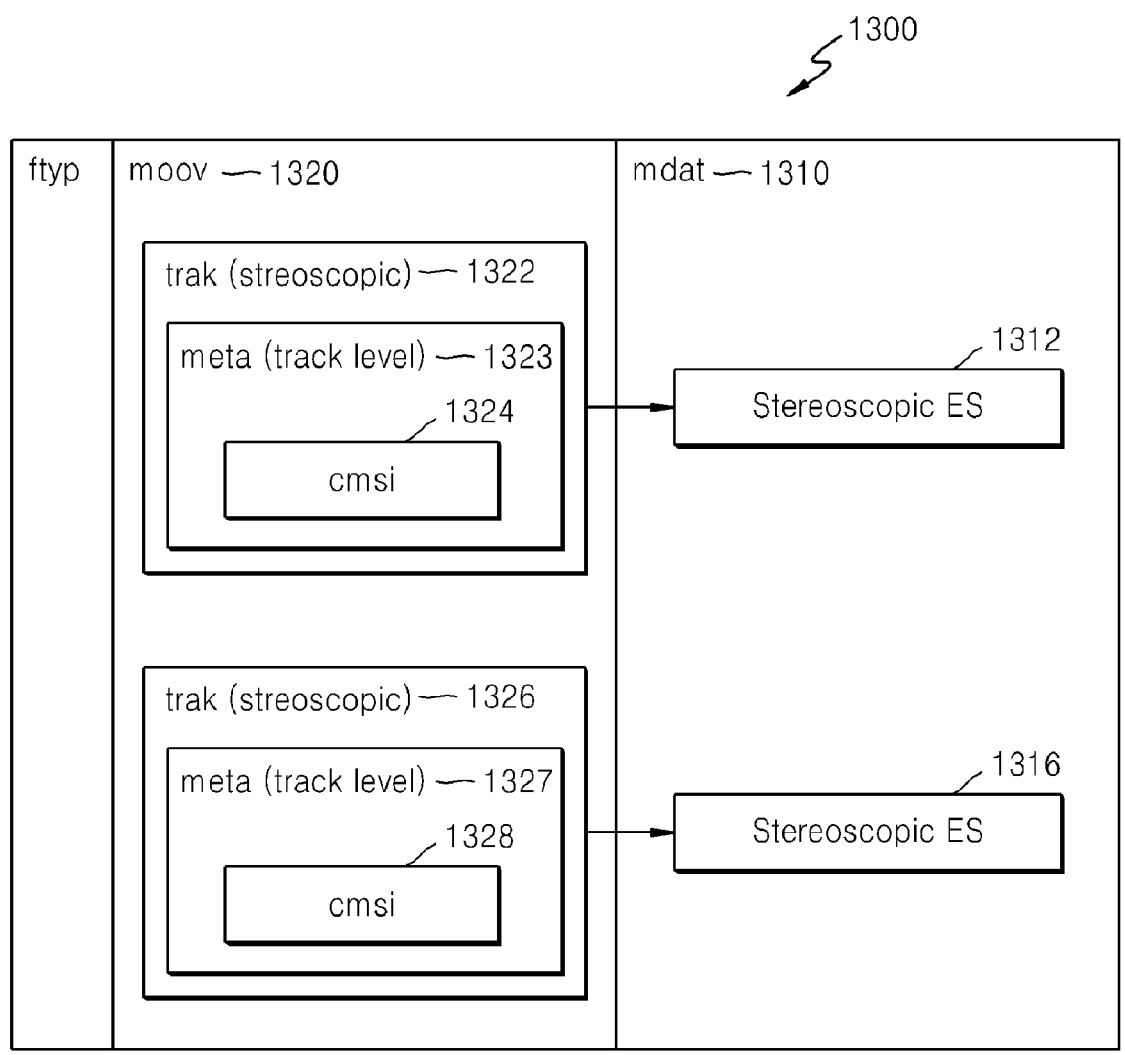
FIG. 13 is a diagram of box locations in an ISO-based media file format in which a camera parameter and a low fatigue parameter are to be stored, according to an exemplary embodiment of the present invention.

FIG. 13 is a diagram of box locations in an ISO-based media file format in which a camera parameter and a low fatigue parameter are to be stored according to an exemplary embodiment of the present invention. Referring to FIG. 13, a multi-view image data stream 1300 in the ISO-based media file format includes an ftyp box, a moov box 1320, and an mdat box 1310. The mdat box 1310 stores ESs 1312 and 1316. The moov box 1320 includes a trak box 1322 storing a parameter with regard to the ES 1312 and a trak box 1326 storing a parameter with regard to the ES 1316.

The multi-view image data stream 1300 corresponds to the cmsi box shown in FIG. 12 that is disposed in a box location 1260. In more detail, a cmsi box 1324 including a parameter storing information on the ES 1312 is located in a lower level of the meta box 1323 that is the lower level box of a trak box 1322.

Likewise, a cmsi box 1328 including a parameter storing information on the ES 1316 is located in a lower level of the meta box 1327 that is the lower level box of a trak box 1326.

Figure 14:
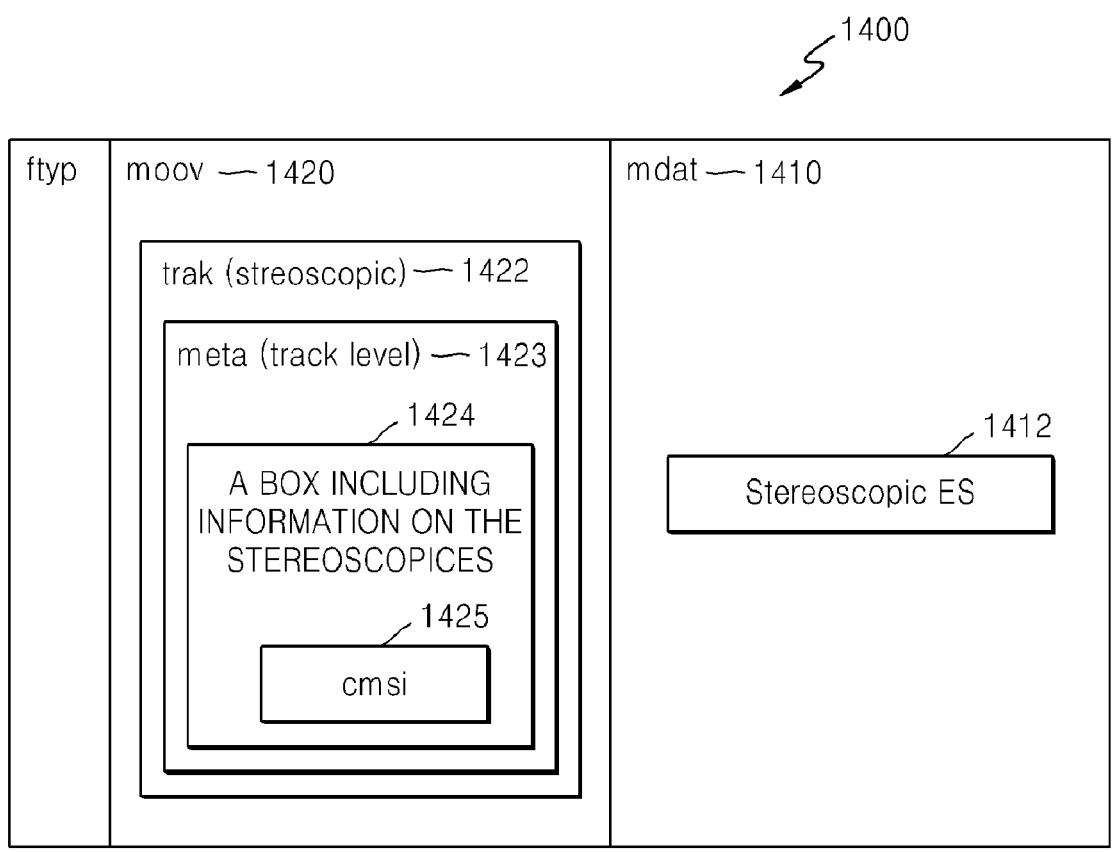
FIG. 14 is a diagram of box locations in an ISO-based media file format in which a camera parameter and a low fatigue parameter are to be stored, according to another exemplary embodiment of the present invention.

FIG. 14 is a diagram of box locations in an ISO-based media file format in which a camera parameter and a low fatigue parameter are to be stored according to another exemplary embodiment of the present invention. Referring to FIG. 14, a multi-view image data stream 1400 includes an ftyp box, an mdat box 1410, and a moov box 1420. The mdat box 1410 includes an ES 1412. The moov box 1420 includes a trak box 1422 including a parameter indicating information on the ES 1412. The trak box 1422 includes a meta box 1423 that includes a box 1424 including information on the ES 1412. A lower level box 1424 of a meta box 1423 includes a cmsi box 1425, thereby recording multi-view image parameters of the present exemplary embodiment.

Figure 15:
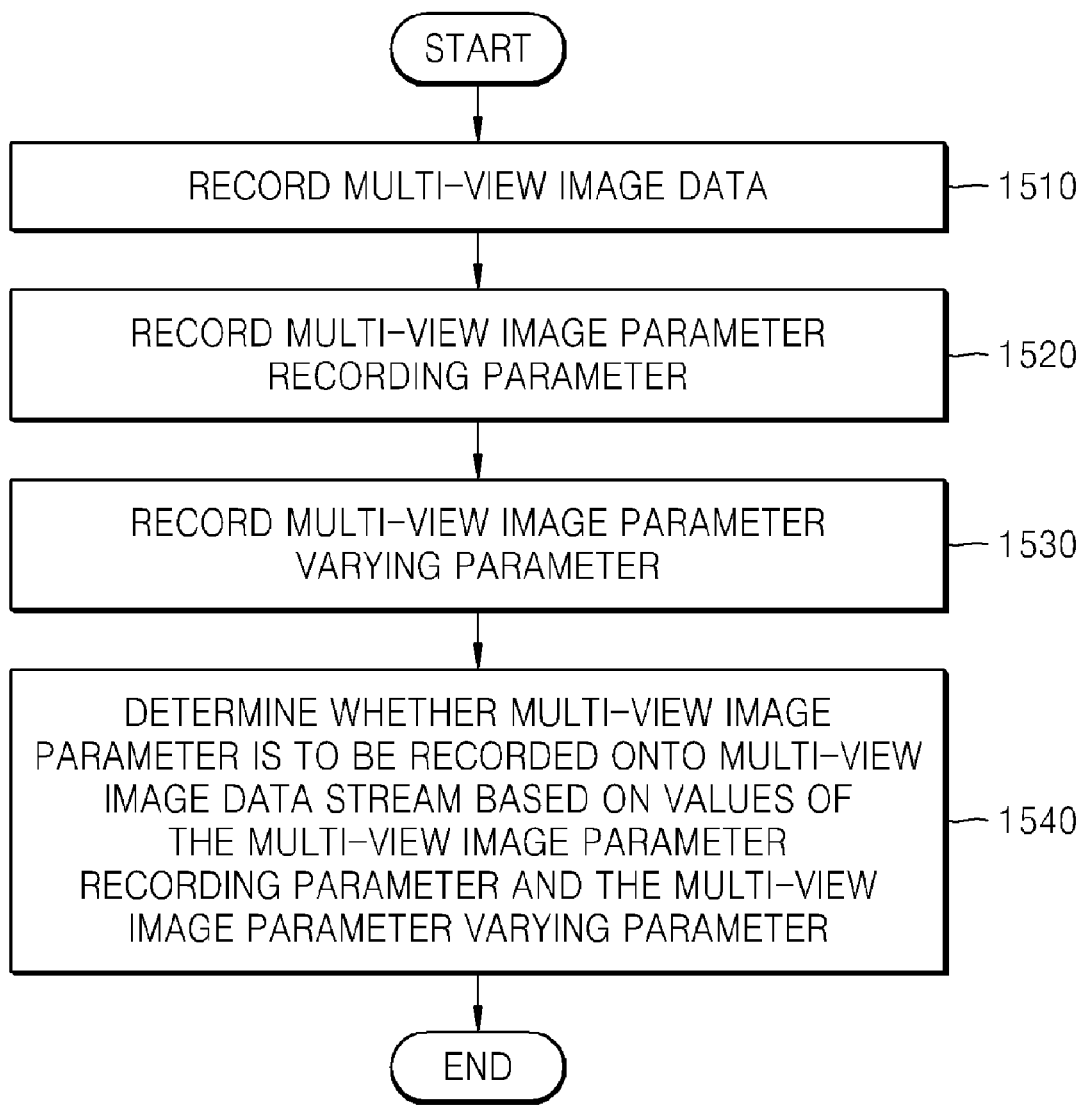
FIG. 15 is a flowchart illustrating a method of generating a multi-view image data stream, according to an exemplary embodiment of the present invention.

FIG. 15 is a flowchart illustrating a method of generating a multi-view image data stream according to an exemplary embodiment of the present invention. Referring to FIG. 15, multi-view image data is recorded onto the multi-view image data stream (operation 1510). The multi-view image data stream may be in an ISO-based media file format.

A multi-view image parameter recording parameter on the multi-view image data is recorded onto the multi-view image data stream (operation 1520). The multi-view image parameter recording parameter indicates whether the multi-view image parameter is to be recorded onto the multi-view image data stream. The multi-view image parameter may include any one of a camera parameter and a low fatigue parameter. Likewise, the multi-view image parameter recording parameter may be established with regard to any one of a camera parameter recording parameter and a low fatigue parameter recording parameter.

A multi-view image parameter varying parameter is recorded onto the multi-view image data stream (operation 1530). The multi-view image parameter varying parameter indicates whether a multi-view image parameter with regard to a current data fragment of the multi-view image data varies from a camera parameter with regard to a previous data fragment. Any one of a camera parameter varying parameter and a low fatigue parameter varying parameter may be established with regard to a corresponding parameter.

It is determined whether the multi-view image parameter is to be recorded onto the multi-view image data stream based on values of the multi-view image parameter recording parameter and the multi-view image parameter varying parameter (operation 1540). If it is determined that the multi-view image parameter is to be recorded onto the multi-view image data stream, the multi-view image parameter is recorded onto the multi-view image data stream.

Although both the multi-view image parameter recording parameter and the multi-view image parameter varying parameter are defined in the present exemplary embodiment, only one of the two parameters may be defined. When any one of them is defined, if the condition of a corresponding parameter is satisfied, the multi-view image parameter may be recorded onto the multi-view image data stream.

Figure 16:
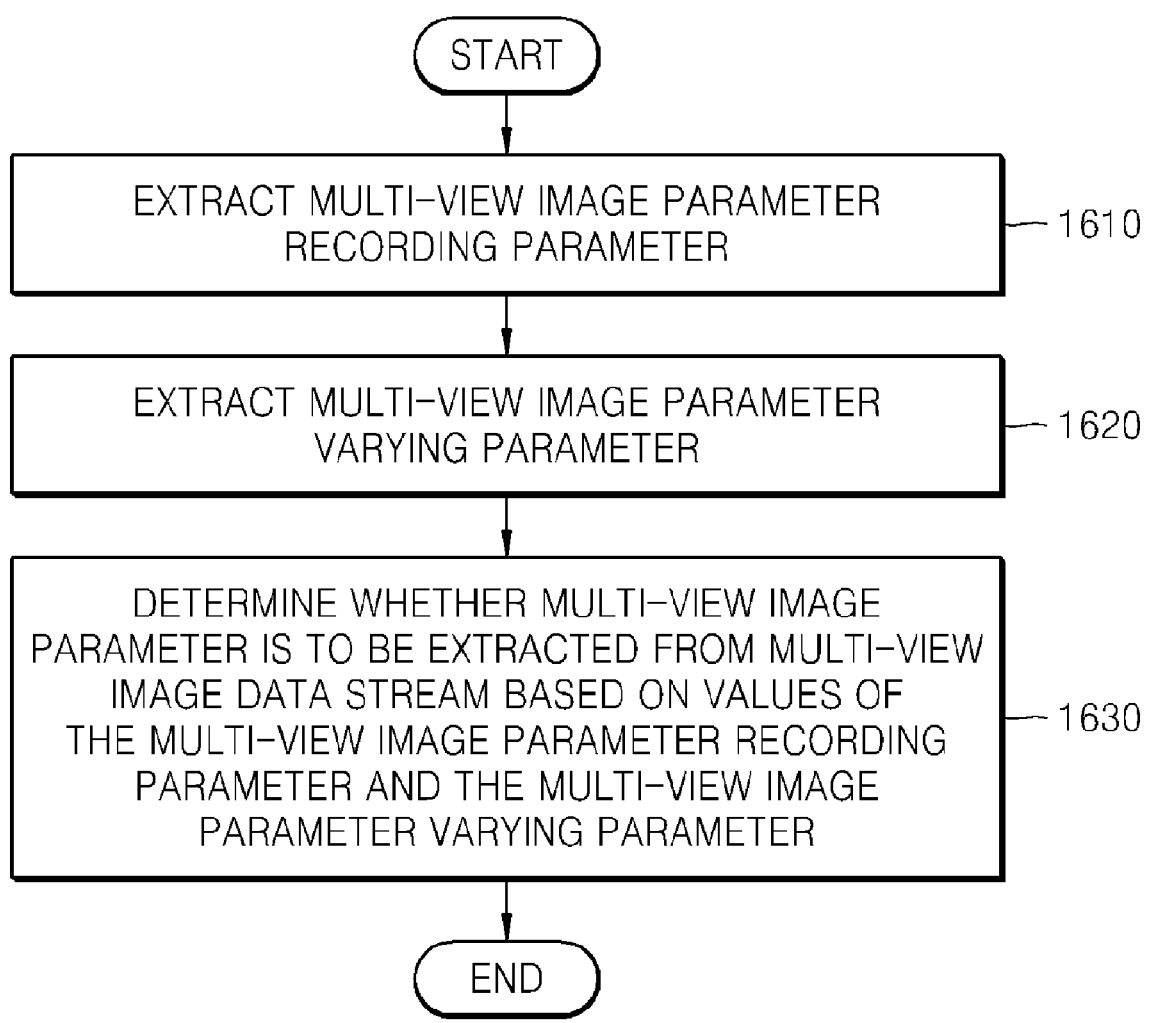
FIG. 16 is a flowchart illustrating a method of decoding a multi-view image data stream, according to an exemplary embodiment of the present invention.

FIG. 16 is a flowchart illustrating a method of decoding a multi-view image data stream according to an exemplary embodiment of the present invention. Referring to FIG. 16, a multi-view image parameter recording parameter is extracted from the multi-view image data stream (operation 1610). At least one of a camera parameter recording parameter and a low fatigue parameter recording parameter may be extracted from the multi-view image data stream.

A multi-view image parameter varying parameter is extracted from the multi-view image data stream (operation 1620). At least one of a camera parameter varying parameter and a low fatigue parameter varying parameter may be extracted from the multi-view image data stream.

It is determined whether the multi-view image parameter is to be extracted from the multi-view image data stream based on values of the multi-view image parameter recording parameter and the multi-view image parameter varying parameter (operation 1630). If it is determined that the multi-view image parameter is to be extracted from the multi-view image data stream, the multi-view image parameter is extracted from the multi-view image data stream.

The method of decoding the multi-view image data stream may extract multi-view image data from the multi-view image data stream. The extracted multi-view image parameter and the extracted multi-view image data may be used to reconstruct a multi-view image Although both the multi-view image parameter recording parameter and the multi-view image parameter varying parameter are defined in the present exemplary embodiment, only one of the two parameters may be defined. When any one of them is defined, if the condition of a corresponding parameter is satisfied, the multi-view image parameter may be extracted from the multi-view image data stream.

The present invention can also be embodied as computer readable code on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The transmission medium can include carrier waves transmitted through the Internet or various types of communication channel. The computer readable recording medium can also be distributed over network coupled computer systems so that the computer readable code is stored and executed in a distributed fashion.

The method and apparatus for generating a multi-view image data stream of the present invention define multi-view image recording parameters and display whether multi-view image parameters are recorded, thereby enhancing utilization of the multi-view image parameters.

The method and apparatus for generating a multi-view image data stream of the present invention also define multi-view image varying parameters and display whether multi-view image parameters of each data fragment vary, thereby enhancing utilization of the multi-view image parameters.

The method and apparatus for generating a multi-view image data stream of the present invention also identify items of image data and define parameters, so that the multi-view image parameters can efficiently display information on a multi-view image based on parameters of a different item.

The method and apparatus for decoding a multi-view image data stream of the present invention confirms whether multi-view image parameters are recorded and multi-view image parameters of each data fragment vary, making it possible to control whether to extract the multi-view image parameters so that the multi-view image can be more efficiently reconstructed using the multi-view image data stream. Also, the multi-view image parameters of each item can refer to each other, thereby easily searching for a necessary parameter.

The method and apparatus for generating and decoding the multi-view image data stream of the present invention enhance a performance of a 3D process, and thus the present invention can be applied to various fields of virtual image combination, intermediate image combination, 3D image display, in addition to multi-view image compression and transmission fields.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of generating a multi-view image data stream, the method comprising:
   inserting multi-view image data in the multi-view image data stream;
   determining a multi-view image parameter recording parameter indicating whether a multi-view image parameter with regard to the multi-view image data is inserted in the multi-view image data stream; and
   inserting the multi-view image parameter recording parameter in the multi-view image data stream,
   wherein the multi-view image parameter is inserted in the multi-view image data stream based on a value of the multi-view image parameter recording parameter,
   the multi-view image parameter comprises a camera parameter with regard to a camera that obtains the multi-view image data, and
   the camera parameter is inserted in the multi-view image data stream based on a value of a camera parameter recording parameter indicating whether the camera parameter is inserted in the multi-view image data stream,
   wherein the inserting the multi-view image parameter recording parameter comprises inserting in the multi-view image data stream a multi-view image parameter varying parameter indicating whether a multi-image parameter with regard to a current data fragment of the multi-view image data varies from a previous multi-view parameter with regard to a previous data fragment of the multi-view image, and
   wherein the multi-view image parameter, the multi-view image parameter recording parameter and the multi-view image parameter varying parameter are distinct parameters.

2. The method of claim 1, wherein the inserting whether the multi-view image parameter is to be inserted further comprises determining whether the multi-view image parameter is inserted in the multi-view image data stream based on values of the multi-view image parameter recording parameter and the multi-view image parameter varying parameter.

3. The method of claim 2, wherein the inserting the multi-view image parameter recording parameter further comprises:
   if the multi-view image parameter with regard to the current data fragment varies from the multi-view image parameter with regard to the previous data fragment and the value of the multi-view image parameter varying parameter is set as "1", and
   if it is determined that the multi-view image parameter is inserted in the multi-view image data stream and the value of the multi-view image parameter recording parameter is set as "1",
   determining that the multi-view image parameter with regard to the current data fragment is inserted in the multi-view image data stream based on the values of the multi-view image parameter recording parameter and the multi-view image parameter varying parameter, and inserting the multi-view image parameter with regard to the current data fragment in the multi-view image data stream.

4. The method of claim 1, wherein the multi-view image parameter comprises at least one piece of information on the multi-view image and each piece of the at least one piece of information is established with regard to each of at least one data fragment.

5. The method of claim 1, wherein the multi-view image parameter further comprises a low fatigue parameter used to reduce fatigue resulting from viewing the multi-view image.

6. The method of claim 1, wherein the camera parameter comprises at least one of information on a center point, information on an aspect ratio of a pixel, information on a distance between cameras, information on a focal point, information on a rotational angle, and information on how cameras are disposed.

7. The method of claim 1, wherein, if the camera is a multi-view camera, the camera parameter comprises at least one of information on a center point, information on an aspect ratio of a pixel, information on a parallel translation matrix between cameras, information on a focal point, information on a rotational angle matrix, and information on how cameras are disposed.

8. The method of claim 5, wherein the low fatigue parameter comprises at least one of information on a recommended viewing distance with regard to the multi-view image, information on a recommended display size, information on a minimum value of a disparity vector, and information on a maximum value of the disparity vector.

9. The method of claim 1, wherein, when the multi-view image comprises a base view image and other view images, a predetermined multiview image parameter with regard to the base view image is established based on at least one multi-view image parameter with regard to the other view images, and a predetermined multi-view image parameter with regard to the other view image is established based on the predetermined multi-view image parameter with regard to the base view image.

10. The method of claim 1, wherein the multi-view image data stream is in an International Standardization Organization (ISO)-based media file format.

11. The method of claim 1, wherein, if the multi-view image data stream is in the ISO-based media file format, the ISO based media file format comprises a moov box, an mdat box, and a meta box,
wherein the multi-view image parameter is inserted in at least one of a lower level box of the meta box that is a same level as the moov box, a lower level box of the moov box, a lower level box of a trak box that is a lower level box of the moov box, a lower level box of an mdia box that is a lower level box of the trak box, a lower level box of a stbl box that is a lower level box of the mdia box, a lower level box of a meta box that is a lower level box of the trak box, and a box inserting information on an elementary stream (ES) that is inserted in the mdat box among lower level boxes of the meta box that is a lower level box of the trak box.

12. A method of decoding a received multi-view image data stream, the method comprising:
extracting from the multi-view image data stream a multi-view image parameter recording parameter indicating whether a multi-view image parameter with regard to the multi-view image data is inserted in the multiview image data stream; and
determining whether the multi-view image parameter is to be extracted from the multi-view image data stream based on a value of the multi-view image data parameter recording parameter,
wherein the multi-view image parameter comprises a camera parameter with regard to a camera that obtains the multi-view image data, and
the camera parameter is extracted from the multi-view image data stream based on a value of a camera parameter recording parameter indicating whether the camera parameter is inserted in the multi-view image data stream,
wherein the extracting the multi-view image parameter recording parameter comprises extracting a multi-view image parameter varying parameter indicating whether a multi-view image parameter with regard to a current data fragment of the multi-view image data varies from a previous multi-view image parameter with regard to a previous data fragment from the multi-view image data stream, and
wherein the multi-view image the multi-view image parameter recording parameter and the multi-view image parameter varying parameter are distinct parameters.

13. The method of claim 12, wherein the determining whether the multi-view image parameter is to be extracted comprises determining whether the multi-view image parameter is to be extracted from the multi-view image data stream based on values of the multi-view image parameter recording parameter and the multi-view image parameter varying parameter.

14. The method of claim 13, wherein the determining whether the multi-view image parameter is to be extracted comprises:
if the value of the multi-view image parameter varying parameter is "1", and if the value of the multi-view image parameter recording parameter is "1",
determining that the multi-view image parameter with regard to the current data fragment is to be extracted from the multi-view image stream and extracting the multi-view image parameter with regard to the current data fragment from the multi-view image stream.

15. The method of claim 12, further comprising:
extracting the multi-view image data from the multi-view image data stream; and
reconstructing the multi-view image using the multi-view image parameter and the extracted multi-view image data.

16. The method of claim 12, wherein the multi-view image parameter comprises at least one piece of information on the multi-view image and each piece of the at least one piece of information is established with regard to each of at least one data fragment.

17. The method of claim 12, wherein the multi-view image parameter further comprises a low fatigue parameter used to reduce fatigue resulting from viewing the multi-view image.

18. The method of claim 12, wherein the camera parameter comprises at least one of information on a center point, information on an aspect ratio of a pixel, information on a distance between cameras, information on a focal point, information on a rotational angle, and information on how cameras are disposed.

19. The method of claim 12, wherein the camera parameter comprises at least one of information on a center point, information on an aspect ratio of a pixel, information on a parallel translation matrix between cameras, information on a focal point, information on a rotational angle matrix, and information on how cameras are disposed.

20. The method of claim 17, wherein the low fatigue parameter comprises at least one of information on a recommended viewing distance with regard to the multi-view image, information on a recommended display size, information on a minimum value of a disparity vector, and information on a maximum value of the disparity vector.

21. The method of claim 12, wherein, when the multi-view image comprises a base view image and other view images, a predetermined multiview image parameter with regard to the base view image is established based on at least one multi-view image parameter with regard to the other view images, and a predetermined multi-view image parameter with regard to the other view image is established based on the predetermined multi-view image parameter with regard to the base view image.

22. The method of claim 12, wherein the multi-view image data stream is in an ISO-based media file format.

23. The method of claim 12, wherein, if the multi-view image data stream is in the ISO based media file format, the ISO-based media file format comprises a moov box, an mdat box, and a meta box,
wherein the multi-view image parameter is inserted in at least one of a lower level box of the meta box that is the same level as the moov box, a lower level box of the moov box, a lower level box of a trak box that is a lower level box of the moov box, a lower level box of an mdia box that is a lower level box of the trak box, a lower level box of a stbl box that is a lower level box of the mdia box, a lower level box of a meta box that is a lower level box of the trak box, and a box inserting information on an ES that is inserted in the mdat box among lower level boxes of the meta box that is a lower level box of the trak box.

24. A non-transitory computer readable recording medium having recorded thereon a program for executing the method of claim 1.

25. A non-transitory computer readable recording medium having recorded thereon a program for executing the method of claim 12.

26. A method of generating a multi-view image data stream, the method comprising:
   inserting multi-view image data in the multi-view image data stream, wherein the multi-view image data comprises a current data fragment being encoded and a previous data fragment that has been previously encoded;
   inserting in the multi-view image data stream a multi-view image parameter recording parameter which indicates whether a multi-view image parameter of a current data fragment is inserted in the multi-view image data stream;
   inserting in the multi-view image data stream a multi-view image parameter varying parameter which indicates whether the multi-view image parameter of the current fragment varies from a previous multi-view image parameter of the previous data fragment;
   determining whether the multi-view image parameter of the current data fragment is inserted in the multi-view image data stream based on a value of the multi-view image parameter recording parameter and a value of the multi-view image parameter varying parameter,
   wherein the multi-view image parameter, the multi-view image parameter recording parameter and the multi-view image parameter varying parameter are distinct parameters.

27. The method of claim 26, wherein the determining whether the multi-view image parameter of the current data fragment is inserted in the multi-view image data stream comprises:
   if the value the multi-view image parameter recording parameter indicates that the multi-view image parameter of the current data fragment is inserted in the multi-view image data stream, and if the multi-view image parameter varying parameter indicates that the multi-view image parameter of the current fragment varies from the previous multi-view image parameter of the previous data fragment, determining that the multi-view image parameter of the current data fragment is inserted in the multi-view image data stream;
   if the value the multi-view image parameter recording parameter indicates that the multi-view image parameter of the current data fragment is not inserted in the multi-view image data stream, determining that the multi-view image parameter of the current data fragment is not inserted in the multi-view image data stream; and
   if the multi-view image parameter varying parameter indicates that the multi-view image parameter of the current fragment does not vary from the previous multi-view image parameter of the previous data fragment, determining that the multi-view image parameter of the current data fragment is not inserted in the multi-view image data stream.

* * * * *